United States Patent Office 3,574,568
Patented Apr. 13, 1971

3,574,568
INSULATED, ELECTRICAL ALUMINIUM
CONDUCTOR
Hans-Olof Hansson, Sollentuna, Sweden, assignor to Telefonaktiebolaget L M Ericsson, Stockholm, Sweden
No Drawing. Filed Mar. 4, 1969, Ser. No. 804,311
Claims priority, application Sweden, Mar. 6, 1968, 2,938/68
Int. Cl. B32b 15/00
U.S. Cl. 29—195                                                    1 Claim

ABSTRACT OF THE DISCLOSURE

This invention pertains to an insulated electrical conductor of aluminium or aluminium alloy. The area of the conductor is covered with a layer of unalloyed tin with a thickness of $0.1\mu$–$0.5\mu$ and a layer applied outside said layer consisting of a tin lead alloy with a thickness of $0.1\mu$–$4.0\mu$ containing between 10% and 80% tin and the remainder lead.

---

The invention relates to an insulated, electrical conductor of aluminium or an aluminium alloy with a diameter less than 3.5 millimeters.

Owing to the rising price of copper this metal has been replaced by aluminium in electrical cables. This has been achieved to a certain extent when it concerns heavy conductors for power current, where may be used by prevailing methods for compressing, welding and soldering joining. For thinner conductors, for power current with a diameter less than 3.5 millimeters and above all for telephone and other signal cables, where the conductor diameter only reaches 0.5–0.8 millimeter, these known joining methods are not suitable. The strength of the material is too small at these small dimensions to allow such compressing or welding. When soldering aluminium, fluxing material had to be used and this as well as the relatively long heating period which is necessary, as this soldering cannot be made so quickly as would be desirable, reduces the strength of the conductor and requires long working time. Conductors with relatively small dimensions have therefore up till now only to a small extent been made of aluminium, as the soldering has been difficult. In order to avoid these difficulties it has been proposed to cover the aluminium wire with a layer of zinc followed by a layer of copper and finally an outside coating of tin. Such a process, however, is complicated and expensive and gives not always the intended result.

The use of aluminium conductors is in accordance with the present invention made possible by providing the conductor of aluminium with a layer of unalloyed tin with a thickness of $0.1$–$0.5\mu$, outside of which there is a thickness of $0.1$–$4.0\mu$ of a tin lead alloy with between 10% and 80% tin and the remaining lead, whereby of course certain other metals, which in small proportions usually are included, could be permitted.

When applying the two layers known methods can be used. Thus the tin layer can suitably be applied by means of an electrolytic method with use of a bath called "Alstan" from M & T Chemicals Inc. Detroit. This method has been described as being very suitable in order to achieve high corrosion resistance, possibility of reproduction and possibility to apply layers of different metals outside the tin layer. The tin lead alloy can even be applied by means of a method known per se for example in the fluoborate method.

The manufacture may be started with a wire of the desired diameter, which will be covered with the two layers, or, which would be the most suitable, the manufacture is started with a thicker dimension, which is covered with tin and tin lead and then is drawn to a desired, thinner dimension. At such a drawing the tin lead forms an effective lubricant, which facilitates the drawing.

A conductor wire according to the invention with tin and tin lead layer has about the same qualities as a copper conductor and can be insulated with all the usual insulating means for example paper, plastic or oil.

We claim:
1. Insulated, electrical conductor of aluminium or aluminium alloy with a diameter less than 3.5 millimeters, characterized in that the area of the conductor is covered with a layer of unalloyed tin with a thickness of $0.1\mu$–$0.5\mu$ and a layer applied outside said layer consisting of a tin-lead alloy with a thickness of $0.1\mu$–$4.0\mu$ containing between 10% and 80% tin and the remainder lead.

References Cited

UNITED STATES PATENTS

| | | | |
|---|---|---|---|
| 1,079,035 | 11/1913 | Tebbetts | 29—197 |
| 1,101,220 | 6/1914 | Tebbetts | 29—197 |
| 1,873,470 | 8/1932 | Peek | 29—197.5 |
| 2,418,265 | 4/1947 | Korpiun | 29—197 |

HYLAND BIZOT, Primary Examiner